United States Patent
Seufert et al.

(10) Patent No.: US 12,519,357 B2
(45) Date of Patent: Jan. 6, 2026

(54) ROTOR WITH PERMANENT MAGNETS

(71) Applicant: Siemens Aktiengesellschaft, Munich (DE)

(72) Inventors: Reiner Seufert, Salz (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 207 days.

(21) Appl. No.: 18/573,851

(22) PCT Filed: Jun. 1, 2022

(86) PCT No.: PCT/EP2022/064917
§ 371 (c)(1),
(2) Date: Dec. 22, 2023

(87) PCT Pub. No.: WO2023/006282
PCT Pub. Date: Feb. 2, 2023

(65) Prior Publication Data
US 2024/0305151 A1 Sep. 12, 2024

(30) Foreign Application Priority Data
Jul. 30, 2021 (EP) .................................. 21188807

(51) Int. Cl.
*H02K 1/27* (2022.01)
*H02K 1/278* (2022.01)
(Continued)

(52) U.S. Cl.
CPC ............... *H02K 1/278* (2013.01); *H02K 1/28* (2013.01); *H02K 15/03* (2013.01)

(58) Field of Classification Search
CPC ........... H02K 1/278; H02K 1/28; H02K 15/03
See application file for complete search history.

(56) References Cited

U.S. PATENT DOCUMENTS

| 6,751,842 B2 * | 6/2004 | Roesel, Jr. ............. H02K 1/278 29/598 |
| 7,057,326 B2 * | 6/2006 | Ren .......................... H02K 1/32 310/156.28 |

(Continued)

FOREIGN PATENT DOCUMENTS

| DE | 2637706 A1 | 2/1978 |
| JP | H06205554 A | 7/1994 |

(Continued)

OTHER PUBLICATIONS

PCT International Search Report and Written Opinion of International Searching Authority mailed Sep. 5, 2022 corresponding to PCT International Application No. PCT/EP2022/064917 filed Jun. 1, 2022.

Primary Examiner — Thomas Truong
(74) Attorney, Agent, or Firm — Henry M. Feiereisen LLC

(57) ABSTRACT

A rotor for a dynamoelectric rotary machine includes a rotor stack, a plurality of permanent magnets, and a binding designed to fix the permanent magnets to the rotor stack, said binding including a binding thread. The permanent magnets each have at a surface of the permanent magnet a shape deviation designed to receive the binding thread and to comprise a conical thickening and an indentation, with a height difference between a highest point of the thickening and a lowest point of the indentation being at least 2% of a thickness of the permanent magnet and at most 20% of the thickness of the permanent magnet.

17 Claims, 3 Drawing Sheets

(51) Int. Cl.
*H02K 1/28* (2006.01)
*H02K 15/03* (2006.01)

(56) References Cited

U.S. PATENT DOCUMENTS

2002/0018730 A1  2/2002  Okuyama et al.
2019/0074739 A1* 3/2019  Brookes ................ H02K 1/278

FOREIGN PATENT DOCUMENTS

| JP | H09308150 A | 11/1997 |
| JP | 2001342502 A | 12/2001 |
| JP | 2008251992 A | 10/2008 |
| RU | 169538 U1 | 3/2017 |

* cited by examiner

ROTOR WITH PERMANENT MAGNETS

CROSS-REFERENCES TO RELATED APPLICATIONS

This application Is the U.S. National Stage of International Application No. PCT/EP2022/064917, filed Jun. 1, 2022, which designated the United States and has been published as International Publication No. WO 2023/006282 A1 and which claims the priority of European Patent Application, Serial No. 21188807.81, Jul. 30, 2021, pursuant to 35 U.S.C. 119 (a)-(d).

BACKGROUND OF THE INVENTION

The invention relates to a rotor with permanent magnets for a dynamoelectric machine.

Metallic magnets used in permanently excited synchronous machines are usually pressed, sintered and finished, for example smoothed or sawn. These production methods generate a smooth surface of the permanent magnets. However, the surface structure of the permanent magnet affects an electric resistance with respect to high-frequency currents resulting there during motor operation, which currents have an undesirable effect on the temperature and the magnetic flux of the permanent magnets.

In order to increase the ohmic resistance magnets are currently also segmented. However, this is very expensive.

A technology for producing rotors of synchronous machines with reduced overheating is known from document RU 169 538 U1. The rotor of a synchronous machine with permanent magnets, fitted with corrugations, is characterized in that the magnets on the outer surface facing the air gap of the machine are provided with corrugations, wherein the depth of the corrugations h is selected to be equal to the wave width b, so the step t is equal to t=h+b. The rotor can be fitted with non-magnetic bands to hold permanent magnets while the rotor bands are provided with flutings, which are designed in a manner similar to in magnets. The cooling surface of the magnets and bands is almost doubled, and this reduces overheating thereof, and the flutings increase the path length for eddy currents which result during operation of the machine, and this reduces the heat build-up on magnet and band.

Document JP 2008 251992 A discloses a powder injection molding method for producing a permanent magnet with shape deviations from 200 to 600 μm.

Document JP 2001 342502 A discloses a permanent magnet for a dynamoelectric rotary machine, having a shape deviation, caused by grooves on a surface of the permanent magnets, wherein the shape deviation comprises at least one thickening and at least one indentation, wherein a height difference between a highest point of the thickening and a lowest point of the indentation is at least 2% of the thickness of the permanent magnet and at most 20% of the thickness of the permanent magnet.

Document DE 26 37 706 A1 discloses a permanent magnet for a dynamoelectric rotary machine, having a shape deviation which is conical. The adhesive strength is increased when gluing the permanent magnets due to the surface enlarged in this way.

Document JP H09 308150 A discloses a rotor of an electric machine with slotted permanent magnets, which are fixed to a shaft with a binding thread in order to suppress eddy currents.

Document JP H06 205554 A discloses a slotted permanent magnet rotor for suppressing eddy currents. The width of the slot, the depth and the spacing are primarily determined by the depth of the penetration of the eddy current, dependent on the excitation frequency. In the case of small electric motors, as a rule, the width is 0.3 mm or less, the depth 2 mm or less and the spacing approx. 3 mm.

The invention is based on the object of creating a rotor for a dynamoelectric rotary machine, wherein permanent magnets of the rotor have increased ohmic resistance.

SUMMARY OF THE INVENTION

The object is achieved by a rotor for a dynamoelectric rotary machine, having:
- a rotor stack,
- a plurality of permanent magnets,
- a binding for fixing the permanent magnets to the rotor stack, wherein the binding has a binding thread,
wherein the permanent magnets each have a shape deviation at a surface of the permanent magnet, which is embodied for receiving the binding thread,
wherein the shape deviation comprises at least one conical thickening and at least one indentation
and wherein a height difference between a highest point of the thickening and a lowest point of the indentation is at least 2% of a thickness of the permanent magnet and at most 20% of the thickness of the permanent magnet.

The invention has the advantage that a rough magnetic surface or structured magnetic surface of this kind increases the ohmic resistance against high-frequency eddy currents. In addition, improved heat dissipation is provided.

The described thickening and the described indentation enlarge the surface of the permanent magnet, and this has a positive effect on heat dissipation. In addition, indentation and thickening or a plurality of indentations and a plurality of thickenings result in intensified turbulence of the air, and this also has a positive effect on heat dissipation.

An embodiment according to which the height difference is at least 5% of the thickness of the permanent magnet and at most 20% of the thickness of the permanent magnet is advantageous.

A typical permanent magnet is, for example, 1.5 mm to 5 mm thick. Explained using the example of a 3 mm thick permanent magnet, the height difference is at least 0.06 mm (corresponds to 2% here), advantageously at least 0.15 mm, and at most 0.6 mm.

Other thicknesses of the magnet are also conceivable, however.

An embodiment according to which the height difference is at least 10 μm and at most 1,000 μm is advantageous.

Preferably, the height difference is at least 10 μm and at most 500 μm.

An embodiment according to which the shape deviation is embodied as a waviness and/or in the form of grooves and/or in the form of furrows and/or in the form of semicircular furrows is advantageous. A combination of said shape deviations is possible.

A combination of the shape deviations is explained using the example of a rotor with external permanent magnet. In this example a surface of the permanent magnet, which points in the direction of an air gap, has the shape deviation in the form of semicircular furrows.

The surfaces of the permanent magnet, which are arranged on the side, point in the direction of an adjacent permanent magnet therefore, can have, for example, furrows here.

Advantageously, the shape deviation comprises conical thickenings.

This shape deviation, also called a conical structure, is particularly advantageous with regard to a suppression of current and creates a high ohmic resistance.

Preferably, the conical thickenings are uniformly distributed over the surface of the permanent magnet.

An embodiment according to which the shape deviation comprises a knurling is advantageous, moreover.

Various types of knurling, for example left knurls, right knurls, knurls with parallel axes, furrows, knurls with elevated peaks, knurls with recessed peaks, diamond knurls and with elevated as well as recessed peaks, as well as circular knurls, are suitable here. A combination of said types of knurl is also conceivable.

An embodiment according to which a difference in width between two adjacent thickenings is at least 10 µm and at most 300 µm is advantageous, moreover.

An embodiment according to which the permanent magnet has at least one further shape deviation is advantageous, wherein the height difference of the shape deviation is at least 10 µm and at most 100 µm, wherein the height difference of the further shape deviation is at least 300 µm and at most 500 µm.

Advantageously, two shape deviations that are different from each other are combined on or at the permanent magnet. For example, the surface pointing toward the air gap can have the shape deviation and a lateral surface of the permanent magnet can have the further shape deviation.

Furthermore, it is also conceivable that, viewed axially, a leading region of the surface, which points in the direction of the air gap, has the shape deviation, and a trailing part, the further shape deviation.

The shape deviation has indentations, which are so wide and so deep that the binding thread can preferably be received entirely. Partial receiving is also possible.

The binding thread has, for example, at least one carbon fiber and/or at least one glass fiber.

For this, the shape deviation advantageously comprises a plurality of grooves, wherein the grooves are arranged at least substantially equidistantly, wherein the grooves have a height difference which is at least 300 µm and at most 500 µm, wherein the grooves have a difference in width which is at least 100 µm and at most 300 µm.

Advantageously, the binding thread has a diameter of at least 100 µm and at most 300 µm. The binding thread can thus be easily placed in the grooves.

This is advantageous since, as a result, the binding thread barely protrudes, or does not protrude at all, from the permanent magnet.

This has the advantage that the effective magnetic air gap can be reduced. No further space is required for the binding.

The object is also achieved by a dynamoelectric machine, in particular dynamoelectric rotary machine, having a rotor.

The object is also achieved by a method for producing a permanent magnet of this kind, with the permanent magnet being produced by means of powder injection molding.

Powder injection molding is also known by the term "MIM method" (Metal Injection Molding).

Powder injection molding advantageously has the following, in particular successive, process steps:

Feedstock production, injection molding, debinding and sintering.

The permanent magnet manufactured in this way can be post-treated.

Feedstock production advantageously occurs by mixing a metal powder, in particular magnetic powder, with a plastic material, preferably a thermoplastic material. The mixture can be referred to as a feedstock.

The feedstock can also contain other substances, for example binders or organic binders.

Heating of the feedstock is advantageous.

Advantageously, the feedstock is subsequently injected in order to obtain the permanent magnet.

The permanent magnet is advantageously exposed to anisotropy during molding in order to obtain an anisotropic permanent magnet. Advantageously, a magnetic field is briefly applied during injection.

Advantageously, a demagnetization subsequently takes place.

BRIEF DESCRIPTION OF THE DRAWING

The invention will be described and explained in more detail below using the exemplary embodiments illustrated in the figures. In the drawings.

DETAILED DESCRIPTION OF PREFERRED EMBODIMENTS

Figure 1:
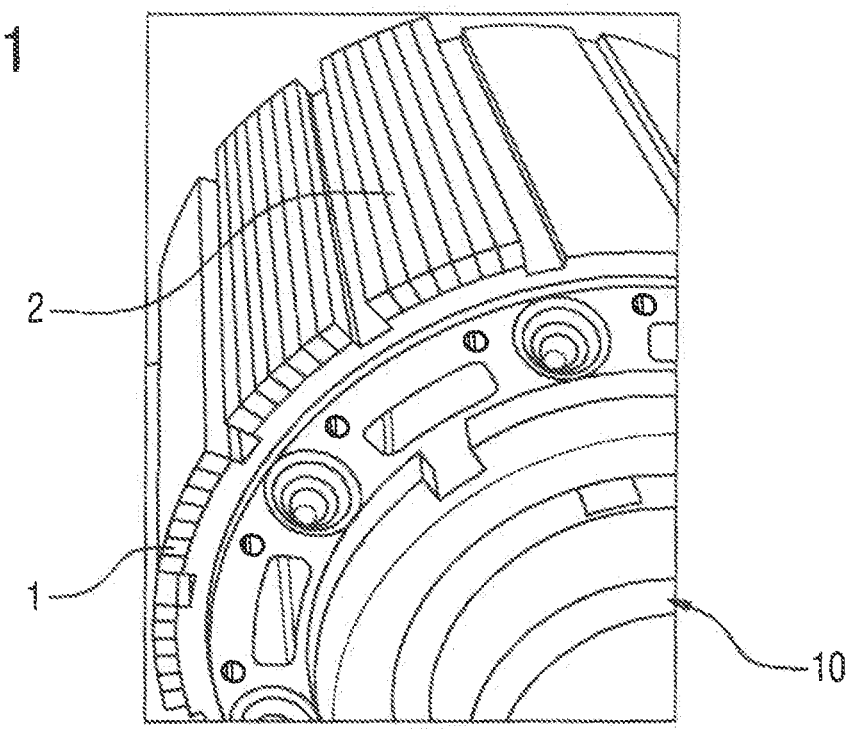
FIG. 1 shows a rotor.

FIG. 1 shows a rotor 10. In the figure, the rotor 10 has a plurality of external permanent magnets.

The permanent magnets 1 have a shape deviation 2.

Figure 2:
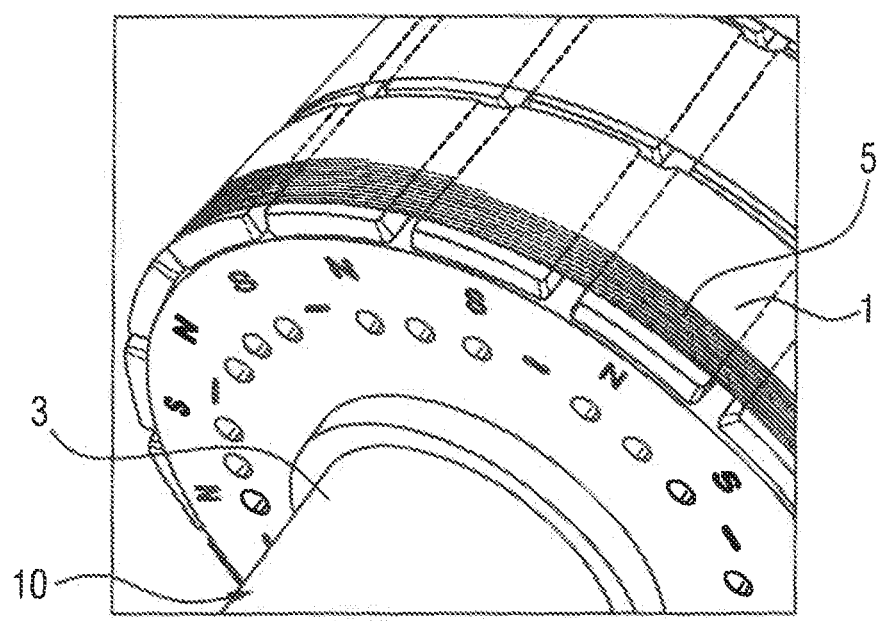
FIG. 2 shows a further embodiment of the rotor.

FIG. 2 shows a further embodiment of the rotor 10.

The rotor 10 has a plurality of external permanent magnets 1, which are banded to the rotor stack for fixing. In the figure, a binding thread 5 has been wound clockwise around permanent magnets 1 and rotor 10 for this purpose.

Figure 3:
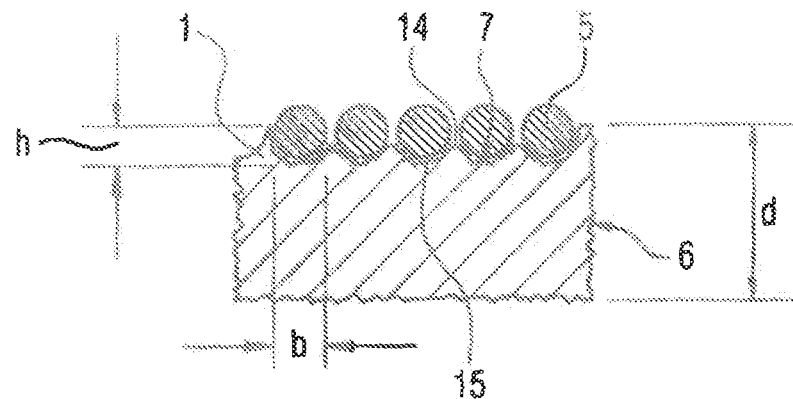
FIG. 3 shows a shape deviation.

As shown in FIG. 3, the binding thread 5 is advantageously located in semicircular indentations 7.

The permanent magnet 1 shown in FIG. 3 has a shape deviation, which is embodied on a surface pointing in the direction of the air gap and is embodied in the form of semicircular indentations.

The indentations are embodied in such a way that the binding thread 5 can be removed.

There is a plurality of possibilities here. The indentations 7 can be so deep that with a surface, which points in the direction of the air gap, the binding thread finishes flush with the thickening 14.

However, as shown in FIG. 3, only partial receiving of the binding thread by the semi-circular indentation 7 is also conceivable.

The permanent magnet 1 also has a further shape deviation 2 on its lower side and on the two side faces. This shape deviation 2 is embodied as a roughness in FIG. 3.

The FIG. 3 shows, moreover, a thickness d of the permanent magnet 1, a height h of the thickening 14 and a width b of the indentation 15.

Figure 4:
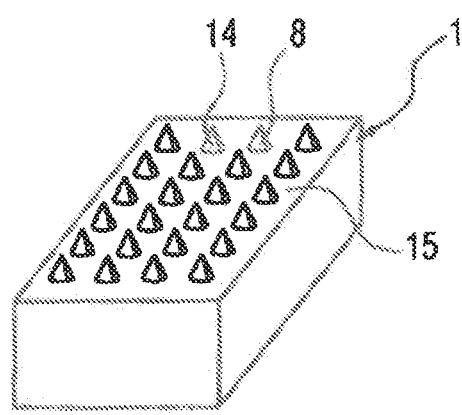
FIG. 4 shows a further embodiment of the shape deviation.

FIG. 4 shows a further embodiment of the shape deviation 2.

The surface of the permanent magnet 1 has a plurality of conical thickenings 8 here.

Conical thickenings 8 are advantageous for the surface or structure for a binding and they represent, moreover, a molding which is easy to form in an injection molding die.

Figure 5:
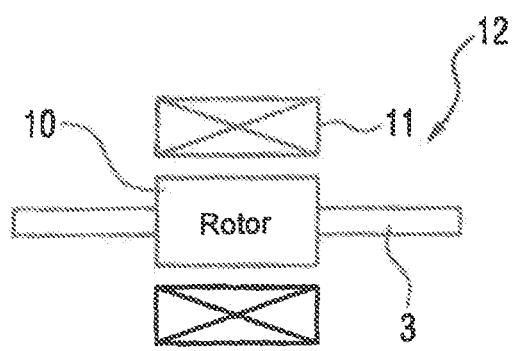
FIG. 5 shows a dynamoelectric machine.

FIG. 5 shows the dynamoelectric machine 12, having a stator 11, a shaft 3 and the rotor 10.

Figure 6:
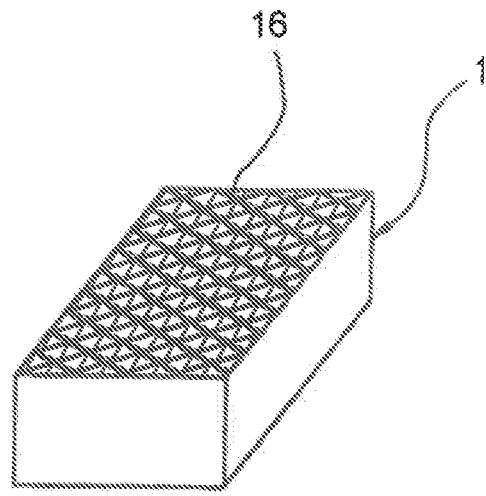
FIG. 6 shows a further embodiment of the permanent magnets.

FIG. 6 shows a further embodiment of the permanent magnet 1.

In FIG. 6, the permanent magnet has a knurling 16. The knurling 16 is also in the form of the shape deviation 2.

The invention offers many advantages. The permanent magnets 1 heat up less due to the reduced currents in the permanent magnets 1. Less expensive magnetic materials can thus also be used.

In addition, the power and torque densities of the motors are increased. The currents are advantageously reduced by the skin effect.

The enlargement of the surface of the permanent magnets 1 also provides improved heat dissipation, which results in cooler magnets. This also has a positive effect with regard to costs and motor performance.

The targeted surface structure for receiving the binding thread results in a smaller magnetically effective air gap and thus to higher magnetic inductions, and this is associated with increased power and torque densities.

In addition, a higher degree of freedom with regard to shape deviations can be achieved due to the used manufacturing method by means of powder injection molding. The permanent magnets 1 can have a flexible design.

Figure 7:
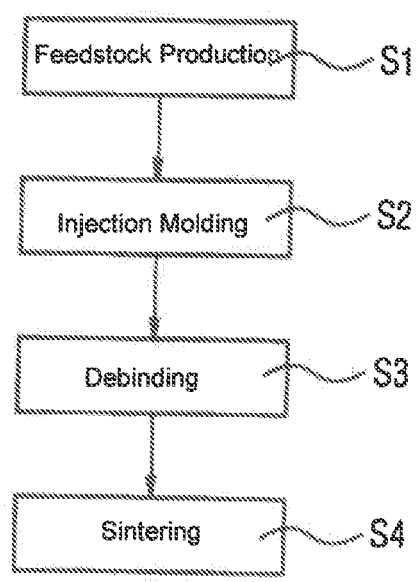
FIG. 7 shows a method for producing the permanent magnet.

FIG. 7 shows a method for producing the permanent magnet 1.

Powder injection molding advantageously has the following, in particular successive process steps:

Feedstock production takes place in method step S1.

Feedstock production advantageously works by mixing a metal powder, in particular magnetic powder, with a plastic material, preferably a thermoplastic material. The mixture can be referred to as a feedstock.

The feedstock can also contain other substances, for example binders or organic binders.

Heating of the feedstock is advantageous.

Injection molding takes place in method step S2.

In S2 the feedstock is injected in order to obtain the permanent magnet.

The permanent magnet is advantageously exposed to a directed magnetic field during molding in order to obtain an anisotropic permanent magnet. A magnetic field is preferably briefly applied during injection.

Debinding, expelling binders therefore, takes place in method step S3.

Debinding preferably takes place at a temperature of 200° C. to 400° C.

Sintering takes place in method step S4.

Sintering preferably takes place at a temperature of 900° C. to 1,100° C.

The permanent magnet 1 is thus effectively solidified.

What is claimed is:

1. A rotor for a dynamoelectric rotary machine, the rotor comprising:
    a rotor stack;
    a plurality of permanent magnets; and
    a binding designed to fix the permanent magnets to the rotor stack, said binding including a binding thread, wherein the permanent magnets each have at a surface of the permanent magnet a shape deviation designed to receive the binding thread and to comprise a conical thickening and an indentation, with a height difference between a highest point of the thickening and a lowest point of the indentation being at least 2% of a thickness of the permanent magnet and at most 20% of the thickness of the permanent magnet.

2. The rotor of claim 1, wherein the height difference is at least 5% of the thickness of the permanent magnet and at most 20% of the thickness of the permanent magnet.

3. The rotor of claim 1, wherein the height difference is at least 10 μm and at most 1,000 μm.

4. The rotor of claim 1, wherein the height difference is at least 10 μm and at most 500 μm.

5. The rotor of claim 1, wherein the shape deviation comprises a waviness and/or grooves and/or furrows and/or semi-circular channels.

6. The rotor of claim 1, wherein the shape deviation comprises a knurling.

7. The rotor of claim 1, wherein a difference in width between two adjacent ones of said thickening is at least 10 μm and at most 300 μm.

8. The rotor of claim 1, wherein the shape deviation comprises a plurality of grooves arranged at least substantially equidistantly, said grooves having a height difference, which is at least 300 μm and at most 500 μm, said grooves having a difference in width, which is at least 100 μm and at most 300 μm.

9. A dynamoelectric machine, in particular dynamoelectric rotary machine, comprising a rotor, said rotor comprising a rotor stack, a plurality of permanent magnets, and a binding designed to fix the permanent magnets to the rotor stack, said binding including a binding thread, wherein the permanent magnets each have at a surface of the permanent magnet a shape deviation designed to receive the binding thread and to comprise a conical thickening and an indentation, with a height difference between a highest point of the thickening and a lowest point of the indentation being at least 2% of a thickness of the permanent magnet and at most 20% of the thickness of the permanent magnet.

10. A method for producing a rotor, the method comprising:
    producing a permanent magnet through powder injection molding; and
    placing a binding thread of a binding in a shape deviation of the permanent magnet for fixing the permanent magnet to a rotor stack, wherein the shape deviation comprises a conical thickening and an indentation, with a height difference between a highest point of the thickening and a lowest point of the indentation being at least 2% of a thickness of the permanent magnet and at most 20% of the thickness of the permanent magnet.

11. The method of claim 10, wherein the height difference is at least 5% of the thickness of the permanent magnet and at most 20% of the thickness of the permanent magnet.

12. The method of claim 10, wherein the height difference is at least 10 μm and at most 1,000 μm.

13. The method of claim 10, wherein the height difference is at least 10 μm and at most 500 μm.

14. The method of claim 10, wherein the shape deviation comprises a waviness and/or grooves and/or furrows and/or semi-circular channels.

15. The method of claim 10, wherein the shape deviation comprises a knurling.

16. The method of claim 10, wherein a difference in width between two adjacent ones of said thickening is at least 10 μm and at most 300 μm.

17. The method of claim 10, wherein the shape deviation comprises a plurality of grooves arranged at least substantially equidistantly, said grooves having a height difference, which is at least 300 µm and at most 500 µm, said grooves having a difference in width, which is at least 100 µm and at most 300 µm.

* * * * *